United States Patent [19]

Saeki et al.

[11] Patent Number: 4,867,786

[45] Date of Patent: Sep. 19, 1989

[54] ELECTROMAGNETIC STIRRING METHOD

[75] Inventors: Mitsuru Saeki, Wakayama; Terutsune Nishio, Ehime; Hiromichi Omura, Osaka, all of Japan

[73] Assignees: Sumitomo Metal Industries, Ltd., Osaka; Sumitomo Heavy Industries, Ltd., Tokyo, both of Japan

[21] Appl. No.: 195,036

[22] Filed: May 17, 1988

[30] Foreign Application Priority Data

May 19, 1987 [JP] Japan ................................ 62-122395

[51] Int. Cl.$^4$ .............................................. C21C 7/00
[52] U.S. Cl. ....................................... 75/10.16; 75/61; 266/234
[58] Field of Search ...................... 75/61, 10.67, 10.16; 266/234

[56] References Cited

U.S. PATENT DOCUMENTS 3,020,323  2/1962  Redfern ................................ 266/234
4,294,435 10/1981  Matsuno ............................... 266/234

FOREIGN PATENT DOCUMENTS 0028369  5/1981  European Pat. Off. .
0028761  5/1981  European Pat. Off. .
56-74359  6/1981  Japan .
56-86661  7/1981  Japan .
58-3759   1/1983  Japan .
58-23554  2/1983  Japan .
0351575   9/1972  U.S.S.R. ................................ 266/234
0624933   9/1978  U.S.S.R. ................................ 266/234

Primary Examiner—S. Kastler
Attorney, Agent, or Firm—Burns, Doane, Swecker & Mathis

[57] ABSTRACT

In an electromagnetic stirring method, one or two electromagnetic inductors are provided to define an internal space therein or therebetween, a plurality of pairs of opposed magentic poles are provided on the inner side walls of the electromagnetic inductors defining the space, and the polarities of the magnetic poles are sequentially rotated by one or two power supply devices to generate a plurality of rotating flows of a molten metal as seen in a cross section thereof as it passes through the internal space defined by the electromagnetic inductors.

5 Claims, 3 Drawing Sheets

ELECTROMAGNETIC STIRRING METHOD

BACKGROUND OF THE INVENTION

1. Field of the Invention

The present invention relates to an electromagnetic stirring method for forming a plurality of rotating flows of a molten metal as seen in the cross section of the molten metal as it passes through a space defined by one or two yokes.

2. Description of the Prior Art

The heretofore available rotating-field type electromagnetic inductor which is used for electromagnetic stirring (1) In the case of electromagnetic stirring of molten metal by a rotating field in a mould or a secondary cooling zone, it is impossible to form a plurality of rotating flows with a still portion retained in the same cross section of the molten metal;

(2) In the case of twin-, triple- or multi-strand pouring, it is difficult to provide a rotating-field inductor if the distance between the strands is not sufficiently large;

(3) In the case of multi-stage stirring, an equal number of inductors and power supplies are required to match the number of stages of stirring.

(4) In the case of casting steel pieces of substantial width, electromagnetic stirring conducted by a rotating-field inductor cannot be effected; and (5) In the case of casting steel pieces of small size in a large continuous casting machine, a rotating-field inductor for the secondary cooling zone which interferes with a common dummy bar piece must be divided into two portions and provided with a lifting device.

SUMMARY OF THE INVENTION

An object of the present invention is to provide an electromagnetic stirring method which is capable of solving all the problems of the prior art mentioned above.

In the electromagnetic stirring method according to the present invention, an electromagnetic inductor defining an internal space therein is provided which has on the inner side walls of its interior a plurality of pairs of opposing magnetic poles, and the polarities of the magnetic poles are sequentially rotated by a power supply device, thereby generating a plurality of rotating flows of a molten metal as seen in a cross section of the molten metal as it passes through the internal space of the electromagnetic inductor.

In a modification of the method according to the present invention, two independent electromagnetic inductors are so disposed as to define a predetermined internal space therebetween, the electromagnetic inductors are provided on the inner side walls of this internal space with a plurality of pairs of opposing magnetic poles, and the polarities of the magnetic poles are sequentially rotated by a power supply device.

BRIEF DESCRIPTION OF THE DRAWINGS

The invention will be better understood from the following description taken in connection with the accompanying drawings in which.

DESCRIPTION OF THE PREFERRED EMBODIMENTS

The electromagnetic stirring method according to the present invention will now be described in detail with reference to the accompanying drawings.

Figure 1:
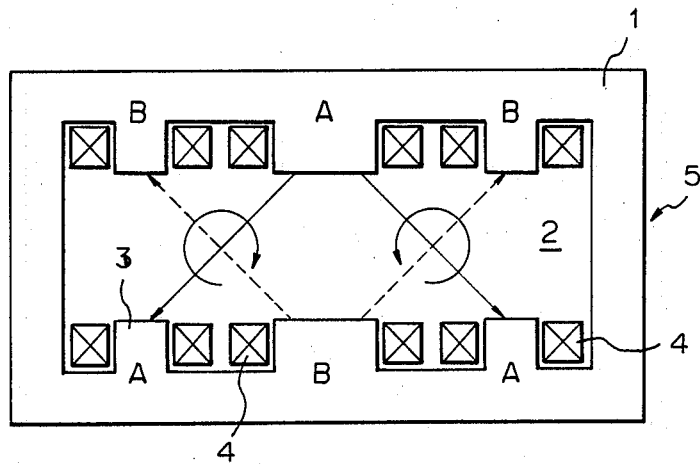
FIG. 1 is a cross-sectional view of an electromagnetic inductor by means of which the method according to the present invention may be practiced.

FIG. 1 shows an embodiment of an electromagnetic inductor 5 comprising a closed yoke 1 which defines a space 2 therein and a plurality of pairs of opposing magnetic poles 3 disposed on the inner walls of the electromagnetic inductor. An electric current is supplied from a power supply device (not shown) to coils 4 of the magnetic poles 3 to activate the electromagnetic inductor 5. In the inductor 5, the magnetic poles 3 are rotated in polarity in two phases as shown.

The embodiment shown in FIG. 1 is an example of two rotations in two phases. The magnetic pole at the center of a side of the yoke has twice the cross-sectional area of the magnetic pole at either end of the side of the yoke. The magnetic flux of a magnetic circuit is given generally by the formula:

$$\phi = \mu . N . I . S \tag{1}$$

wherein $\phi$: magnetic flux
$\mu$: permeability
$N$: number of turns
$I$: current
$S$: cross-sectional area of magnetic pole If the cross-sectional area of the larger magnetic pole at the center is S and the number of turns N and the current I are equal throughout the coils at the center and at the ends, then the magnetic flux of the smaller magnetic pole at either end is $\mu.N.I.S/2 = \phi/2$, that is the magnetic flux of the central magnetic pole is equal to the total of the magnetic fluxes of the two smaller magnetic poles diagonally opposed thereto. Therefore, one half of the total magnetic fluxes passes one of the two rotation points while the other half of the total magnetic fluxes passes the other of the two rotation points in the stirring space 2. The order of the two phases of one magnetic field is reverse to the order of the two phases of the other magnetic field, thereby causing two rotations in opposite directions.

Figure 2:
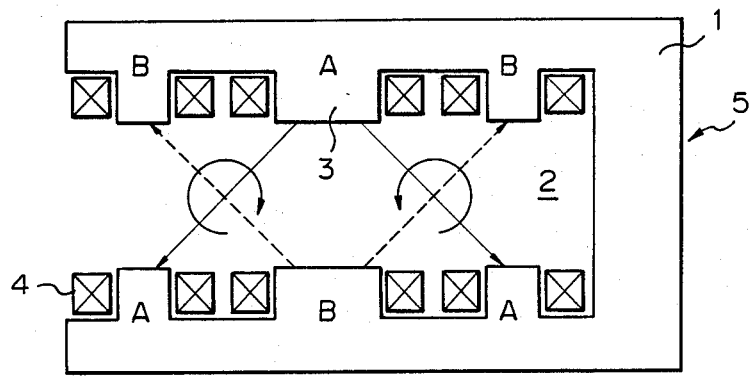
FIG. 2 is a cross-sectional view of a modification of the electromagnetic inductor of FIG. 1.

FIG. 2 shows a modification of the embodiment of FIG. 1, in which the yoke 1 is opened in one of the two smaller sides to form a substantially C-shaped cross section.

If the currents of the two phases are $I_1$ and $I_2$, the formula (1) is transformed as follows:

$$\phi_1 = \mu.N.I_1.S$$

$$\phi_2 = \mu.N.I_2.S$$

Therefore, $$\phi' = \mu.N.S.(I_1 + I_2) \tag{2}$$

Here, since there is a 90° phase difference between the currents $I_1$ and $I_2$, $$I_1 + I_2 = \sqrt{2} I$$

$$\phi' = \sqrt{2} \cdot \mu \cdot N \cdot S \cdot I \tag{3}$$

Therefore $\phi' \sqrt{2} \cdot \phi$

If the magnetic flux density is B then $$\phi = B \cdot S$$

Therefore, $$\phi' = \sqrt{2} \cdot B \cdot S \tag{4}$$

From the foregoing, it is evident that the shorter side of the yoke 1 must have $\sqrt{2}$ times the cross-sectional area of that of the central magnetic pole if the yoke is opened on one of the shorter sides as shown in FIG. 2 and $1/\sqrt{2}$ times the cross-sectional area of that of the central magnetic pole if the yoke is closed on four sides as shown in FIG. 1.

Figure 3:
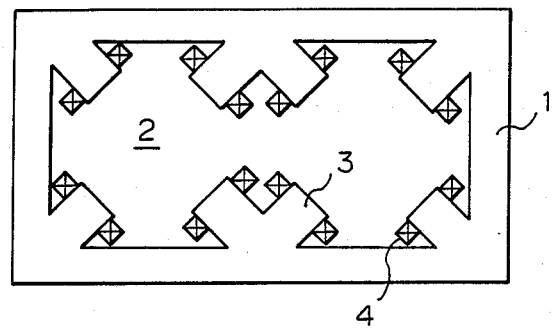
FIG. 3 is a cross-sectional view of another modification of the electromagnetic inductor of FIG. 1.

FIG. 3 shows another modification of the embodiment of FIG. 1, in which the magnetic poles 3 are diagonally disposed.

Figure 4:
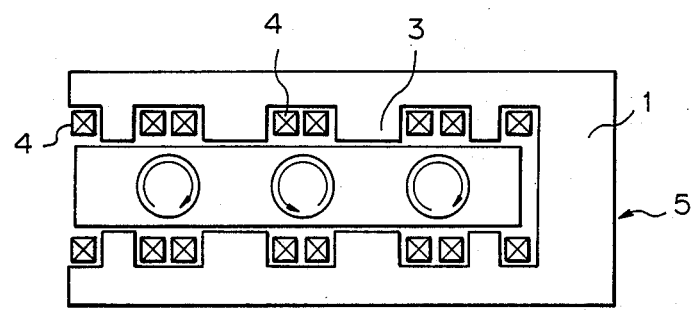
FIG. 4 is a cross-sectional view of a modification of the electromagnetic inductor of FIG. 2.

FIG. 4 shows a further modification of the embodiment shown in FIG. 2, in which three rotating magnetic fields are formed.

Figure 5:
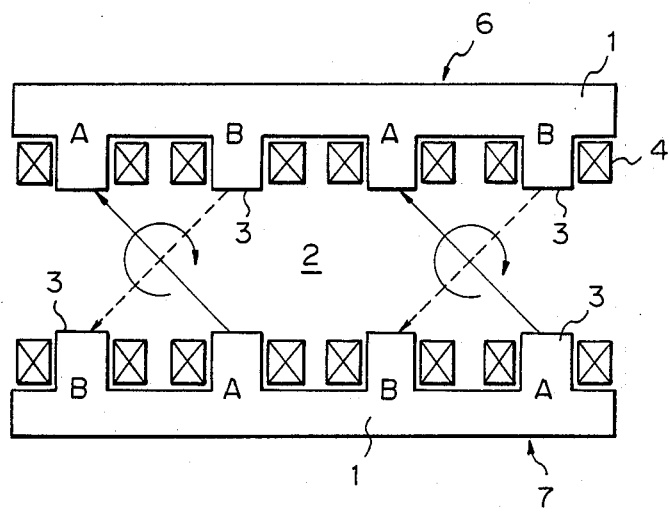
FIG. 5 is a cross-sectional view of electromagnetic inductors of another form by means of which the method according to present invention may be practiced.

FIG. 5 shows another embodiment of the present invention, in which two independent electromagnetic inductors 6 and 7 are disposed to define a space 2 therebetween.

The magnetic fluxes of the two phases cross each other on the center line between the two parallel inductors 6 and 7 and form a rotating magnetic field. Two rotating magnetic fields can be formed in the same plane by doubling the number of magnetic poles and making the magnetic fluxes cross each other at two points. Similarly, a large number of rotating magnetic fields can be made by increasing the number of magnetic poles. Further, the direction of rotation of a plurality of rotating fields in the same plane can be arbitrarily determined by changing the arrangement of the coils of each phase and a still portion can be made by enlarging the distance between the centers of rotation.

Figure 6:
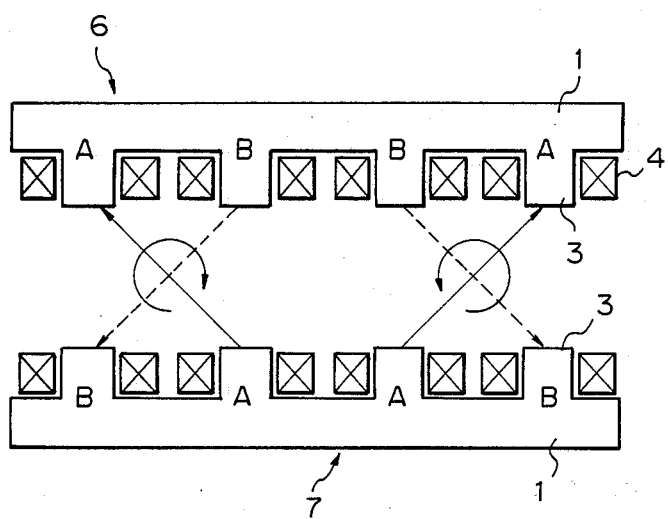
FIG. 6 is a cross-sectional view of a modification of the electromagnetic inductors shown in FIG. 5.

In the case of the magnetic field providing two rotations in two phases, the magnetic fluxes in two phases are opposite to each other in direction and cross each other at two stirring positions to form magnetic paths for reciprocation of the magnetic fluxes. Accordingly, the yoke connecting the parallel inductors 6 and 7 is not necessary and the yoke 1 is needed to connect the magnetic poles S in each of the inductors 6 and 7. I the arrangement of the coils 4 shown in FIG. 5, the rotations at two positions occur in the same direction because the magnetic fields in the two phases are of the same order, while in the arrangement of the coils shown in FIG. 6, the rotations at two positions occur in opposite directions because the magnetic fields in the two phases are opposite.

The electromagnetic stirring method according to the present invention provides the following meritorious effects:

(1) In the case of twin-, triple- or multi-strand pouring, the distance between the strands may be small because no inductor needs to be provided between the strands;

(2) A plurality of rotating-field type electromagnetic stirring apparatuses can be composed of one or a pair of inductors and a power supply device;

(3) A plurality of rotations can be formed in any desired direction in the same cross-sectional portion of a molten metal;

(4) In regard to electromagnetic stirring in the secondary cooling zone, multi-stage stirring can be performed by one or a pair of inductors and a power supply device;

(5) Two-phase rotating-field electromagnetic stirring can be applied to casting of steel pieces of large width such as slabs; and (6) In regard to electromagnetic stirring in the secondary cooling zone, the inductor does not interfere with the common dummy bar piece even when the latter has a substantial width.

While we have described and illustrated a present preferred method of practicing the invention, it is to be clearly understood that the invention is not limited thereto but may be otherwise practiced in a variety of ways within the scope of the following claims.

What is claimed is:

1. An electromagnetic stirring method wherein an electromagnetic inductor defining an internal space is provided with a plurality of pairs of opposing magnetic poles on the inner side walls of the internal space so defined, and the polarities of said magnetic poles are sequentially rotated by a power supply device to generate a plurality of rotating flows of a molten metal as seen in a cross section of the molten metal as it passes through the internal space in the electromagnetic inductor.

2. An electromagnetic stirring method as set forth in claim 1, wherein said electromagnetic inductor comprises a closed yoke.

3. An electromagnetic stirring method as set forth in claim 1, wherein said electromagnetic inductor comprises an opened yoke.

4. An electromagnetic stirring method as set forth in claim 1, wherein said magnetic poles are diagonally disposed.

5. An electromagnetic stirring method wherein two independent electromagnetic inductors are disposed to define a predetermined internal space therebetween, a plurality of pairs of opposing magnetic poles are provided on the inner side walls of said electromagnetic inductors defining the space, and the polarities of said magnetic poles are sequentially rotated by a power supply device to generate a plurality of rotating flows of a molten metal as seen in a cross section of the molten metal as it passes through the internal space defined by said electromagnetic inductors.

* * * * *